Figure 1:
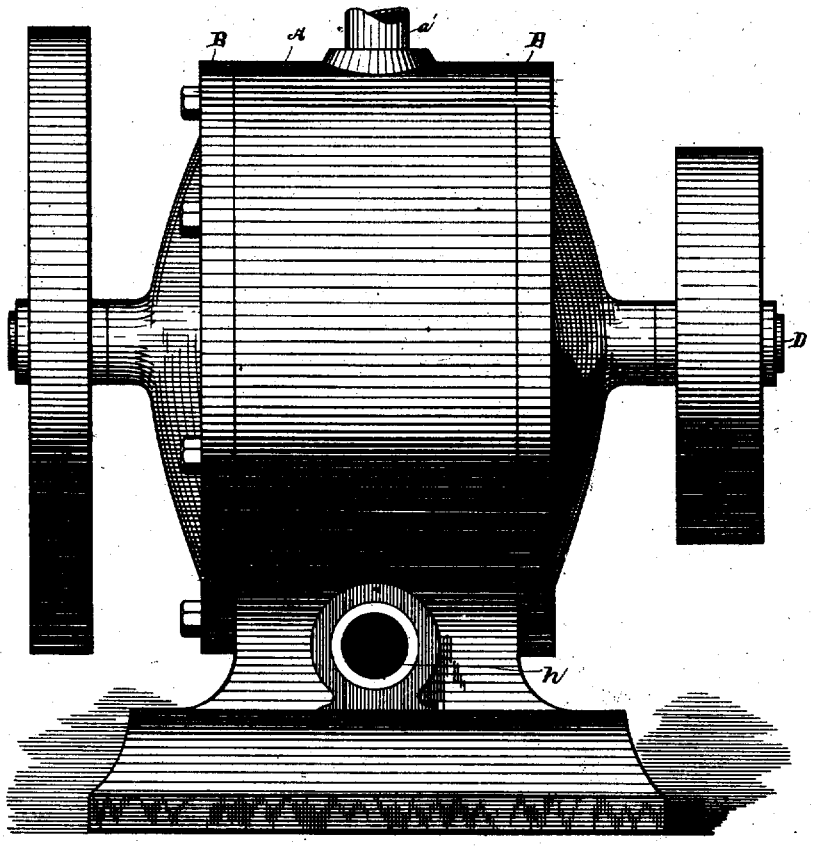

(No Model.) 4 Sheets—Sheet 1.

J. H. DOW.

Assignor of one-half to W. CHISHOLM.

ROTARY STEAM ENGINE.

No. 11,028. Reissued Sept. 3, 1889.

Witnesses
C. S. Lowrie
Neil B. Sage

Inventor
Joseph H. Dow.
By Geggett & Geggett
Attorneys.

THE NORRIS PETERS CO., PHOTO-LITHO., WASHINGTON, D. C.

(No Model.)

4 Sheets—Sheet 2.

J. H. DOW.

Assignor of one-half to W. CHISHOLM.

ROTARY STEAM ENGINE.

No. 11,028. Reissued Sept. 3, 1889.

Witnesses
B. S. Lowrie.
Will B. Sage

Inventor
Joseph H. Dow
By Leggett and Leggett
Attorneys.

THE NORRIS PETERS CO., PHOTO-LITHO., WASHINGTON, D. C.

(No Model.) 4 Sheets—Sheet 3.

J. H. DOW.

Assignor of one-half to W. CHISHOLM.

ROTARY STEAM ENGINE.

No. 11,028. Reissued Sept. 3, 1889.

Witnesses.
C. S. Lowrie
Hill B. Sage

Inventor.
Joseph H. Dow.
By Leggett & Leggett.
Attorneys.

THE MORRIS PETERS CO., PHOTO-LITHO., WASHINGTON, D. C.

(No Model.)

4 Sheets—Sheet 4.

J. H. DOW.

Assignor of one-half to W. CHISHOLM.

ROTARY STEAM ENGINE.

No. 11,028.

Reissued Sept. 3, 1889.

Witnesses:
C. S. Lowrie.
Hill B. Sage

Inventor
Joseph H. Dow
By Leggett & Leggett.
Attorneys.

THE NORRIS PETERS CO., PHOTO-LITHO., WASHINGTON, D. C.

UNITED STATES PATENT OFFICE.

JOSEPH H. DOW, OF CLEVELAND, OHIO, ASSIGNOR OF ONE-HALF TO WILLIAM CHISHOLM, OF SAME PLACE.

ROTARY STEAM-ENGINE.

SPECIFICATION forming part of Reissued Letters Patent No. 11,028, dated September 3, 1889.

Original No. 392,545, dated November 6, 1888. Application for reissue filed August 6, 1889. Serial No. 319,956.

*To all whom it may concern:*

Be it known that I, JOSEPH H. DOW, of Cleveland, in the county of Cuyahoga and State of Ohio, have invented certain new and useful Improvements in Rotary Steam-Engines; and I do hereby declare the following to be a full, clear, and exact description of the invention, such as will enable others skilled in the art to which it pertains to make and use the same.

My invention relates to improvements in rotary steam-engines in which the engine is of the double variety, having a casing inclosing stationary disks facing outward and rotating disks facing inward, the latter being mounted on a shaft in common, and is designed more particularly as an improvement on Patent No. 360,766, granted to me April 5, 1887. The stationary disks each have two or more series of curved chutes or wings arranged on the faces thereof, the chutes of each series being arranged in concentric order with the engine-shaft. The rotating disks have, respectively, series of curved buckets arranged with the inner faces thereof in order concentric with the shaft, such series corresponding in number with the series of chutes, the different series of buckets being made to travel in annular paths between or radially outside the respective series of chutes, but without contact, the relative width of the annular paths and of the buckets and chutes operating therein being such as to leave annular steam passage-ways between adjacent buckets and chutes. The chutes are slightly separated, the one from the other, leaving curved passage-ways or vents between them, and the same arrangement is had with the buckets, the curves of these passage-ways, respectively, of the chutes and buckets being in reverse order. By means of the curved vents the steam is directed against the buckets at the proper angle to propel the latter by impact or momentum of the steam, the direction of the latter being reversed from chute to bucket and from bucket to chute throughout the system, and the series may be multiplied or compounded to any extent necessary to utilize substantially the expansive energy of the steam, to the end that high speed of engine is attained and great power developed as compared with the amount of steam used, and that the engine is approximately frictionless and can be made at a small initial cost per horse-power.

My invention also relates to details of construction hereinafter described, and pointed out in the claims.

Figure 2:
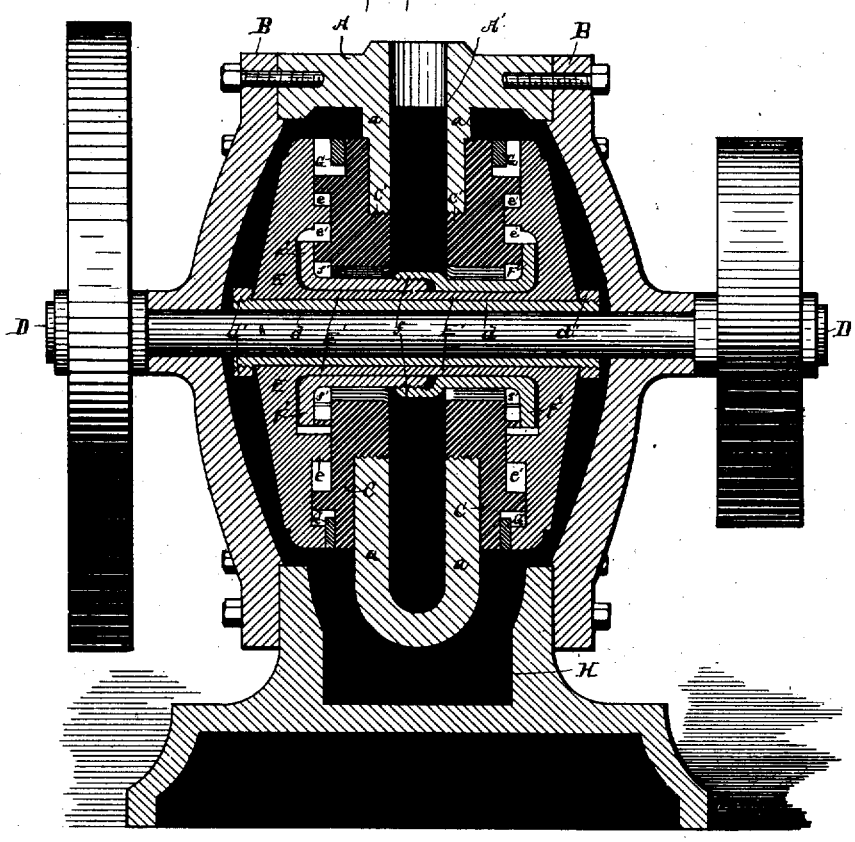
Figure 3:
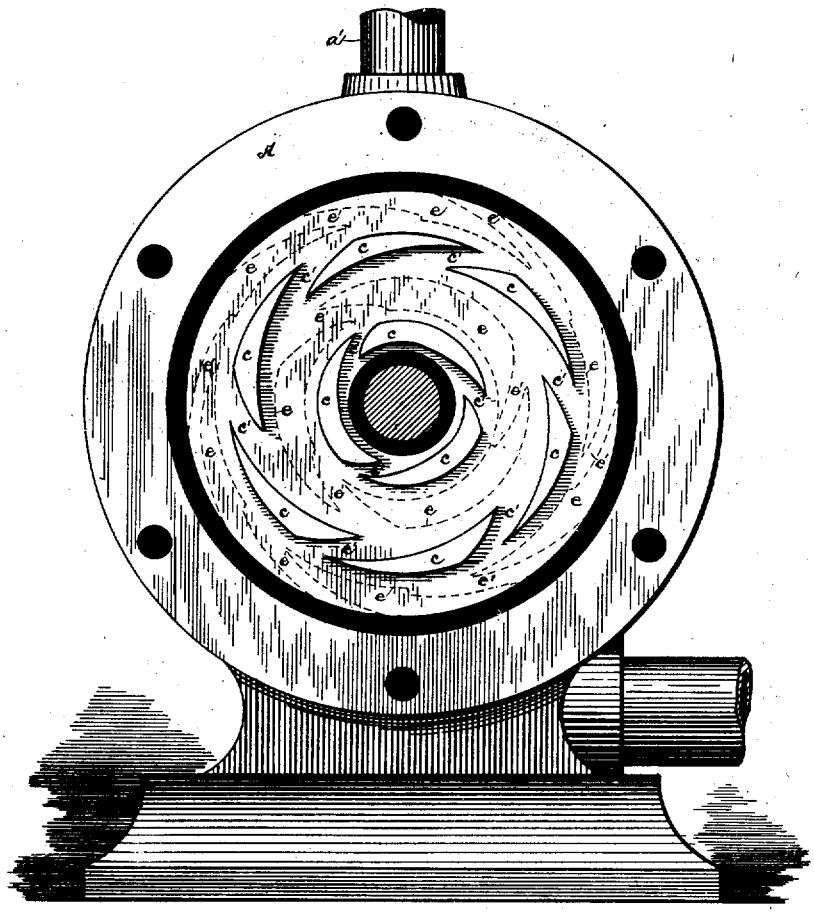
Figure 4:
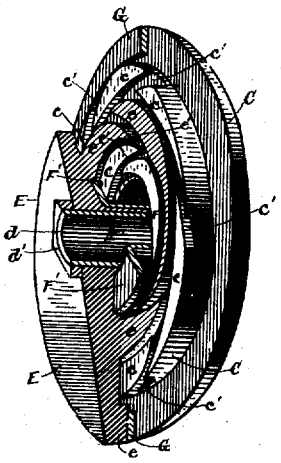

In the accompanying drawings, Figure 1 is a side elevation of my improved engine. Fig. 2 is an elevation in longitudinal section taken through the center of the engine. Fig. 3 is an end elevation with a head and bucket-wheel removed, showing more especially the relation of ways and buckets, the former being in solid lines and the latter in dotted lines; and Fig. 4 is a view in perspective of one stationary and one rotating disk, the latter being shown in section.

A represents the body or shell of the engine, to which are detachably secured the heads B, the latter having suitable boxes, in which is journaled the engine-shaft D. The shell A is provided with internal annular flanges *a*, the same being "faced off" and screw-threaded at their internal periphery to receive disks C, the latter having hub C′ screw-threaded externally for engaging the screw-threads of the aforesaid flanges. With this construction the disks are easily detached, and when in place are "brought true" with the other parts of the engine. The two flanges and the two disks are separated to form the steam-chamber A′, the latter being in open relation with the induction steam-pipe *a*′.

The disks C on the outer faces are provided with two or more series of curved wings or chutes *c*, arranged in order concentric with the shaft D, the ends of adjacent chutes of a series overlapping and slightly separated from each other to form the vent or port *c*′. The shaft D has mounted thereon and rigidly attached thereto a double-cone sleeve *d*, the said sleeve being made slightly tapering from a transverse center line toward either end, this conical feature being hardly perceptible in the drawings. The ends of the sleeve are screw-threaded and provided with nuts *d*′.

E are rotating disks or wheels that are mounted on the sleeve *d*. These wheels have long hubs E′, the latter being bored slightly tapering to fit, respectively, the conical sections of the sleeve *d*. The wheels may be forced onto the sleeve and held in position by means of the nuts *d′*, the wheels being held from turning on the sleeve by friction. With such construction the wheels may be placed upon the sleeve and faced off, and afterward may be removed and reassembled in the engine without danger of losing their alignment. The wheels E have on their inner faces buckets *e*, arranged in concentric series, as shown in dotted lines, Fig. 3, each series of buckets being made to run in annular paths had between the chutes or radially outside the chutes. The buckets are separated, the one from the other, and leave vents or ports *e′*, and these are arranged in the reverse order to the vents *c′*. The chutes and buckets do not come in contact with each other, the annular paths between the different series of chutes and between the different series of buckets being considerably broader than the respective series of buckets and chutes operating therein, whereby a portion of each annular path on either side of the respective bucket or chute series constitutes annular passage-ways for the flow and distribution of steam and consequent equalization of steam-pressure, whereby any jarring of the engine incident to fluctuating discharges of steam is avoided; but the faces of the chutes and buckets should come as near the opposing wheels and disks as is practicable, and still leave working clearance, so that while these parts are relative to each other frictionless there is practically little or no waste of steam past the faces of the buckets and chutes. The inner extreme of chamber A′ is closed by sleeve F, the latter being screwed together, for instance, at *f*. These sleeves have external flanges F′, that overlap the outer faces of the inner series of chutes *c*, thus closing up vents *c′* of this series on the side next the opposing wheels E, so that there can be no leakage of steam past the faces of these inner chutes. These sleeves and flanges serve as clamps to hold the disk E as against pressure in the steam-chamber. The sleeves F are somewhat less in diameter than the bore of the disk C. Consequently an annular space *f′* is left between the edges of the disk and the sleeve, through which space steam may freely pass from the chamber A′ to the inner series of vents. Rings G are attached to the face of wheels E in position to cover the faces of the outer series of buckets, the disk C being recessed to receive such rings without contact, but leaving as little space as may be between the ring and disk. These rings practically prevent any escape of steam between the faces of the outer series of buckets and the opposing wheels, for the reason that the steam will take the more direct course through the larger outlets between the buckets—that is to say, through the outer vents *e′*, which lead direct to exhaust-chamber H, which latter discharges into the exhaust-pipe *h*.

This engine is driven by both impact and reaction of steam upon the buckets, and if some non-elastic substance—such, for instance, as water—were introduced after impact and reaction upon the first series of buckets, the water would give no further motive power, but, instead, would obstruct and clog the engine. The steam, after it has operated upon the first series of buckets, expands, and by reason of such expansion gathers momentum for the next series of buckets, and so on through the successive series, or until the expansive force of the steam has been substantially utilized. The series of chutes and buckets may, therefore, be extended indefinitely, according to the circumstances, and according to the initial pressure of the steam employed.

What I claim is—

1. In a rotary steam-engine, the combination, with engine-shaft and a double-cone sleeve mounted on the engine-shaft, substantially as indicated, of bucket-wheels mounted on the respective conical sections of the said sleeve, substantially as set forth.

2. In a rotary steam-engine, the combination, with engine-shaft and double-cone sleeve mounted on the shaft, of bucket-wheels mounted on the said sleeve, said bucket-wheels having hubs set facing each other, said wheels and hubs having conical bores made to fit the respective conical sections of the sleeve, substantially as set forth.

3. In a rotary steam-engine, the combination, with engine-shaft and a double-cone sleeve mounted on the shaft, of bucket-wheels and attached hubs set facing each other mounted on the said sleeve, the sleeve having external screw-threads at the respective ends thereof, and nuts for engaging such threads, said nuts being made to abut the respective outer faces of the bucket-wheels, substantially as set forth.

4. In a rotary steam-engine, the combination, with stationary disks and intervening steam-chamber, substantially as indicated, of sleeves for closing the inner periphery of the steam-chamber, said sleeves being screwed together and having external flanges made to clamp the disks as against internal pressure, substantially as set forth.

5. In a rotary steam-engine, the combination, with stationary disks and intervening steam-chamber, said disks having series of chutes and vent arranged thereon, substantially as indicated, of sleeves made to close the inner periphery of the steam-chamber, said sleeves having external flanges made to cover the faces of the inner series of chutes, substantially as set forth.

6. In a rotary steam-engine, the combination, with stationary disks, chutes, and vents, and rotary wheels with buckets, substantially as indicated, of rings made to cover the faces of the outer series of buckets, said stationary disks having recesses to receive such rings, substantially as set forth.

7. In a rotary steam-engine, in combination, stationary disks and opposing rotating wheels bearing, respectively, chutes and buckets arranged in series, substantially as indicated, annular paths between the different series, the relative width of such paths as compared with the buckets or chutes operating therein being such as to include annular steam-distributing passage-ways between adjacent buckets and chutes, substantially as set forth.

In testimony whereof I sign this specification, in the presence of two witnesses, this 14th day of June, 1889.

JOSEPH H. DOW.

Witnesses:
CHAS. H. DORER,
S. G. NOTTINGHAM.